United States Patent [19]

Koch

[11] 4,067,554
[45] Jan. 10, 1978

[54] METHOD AND APPARATUS FOR EXTRUDING PLASTIC AND SIMILAR MATERIAL

[75] Inventor: Klaus Koch, Gleidingen, Germany

[73] Assignee: Paul Troester Maschinenfabrik, Germany

[21] Appl. No.: 727,989

[22] Filed: Sept. 29, 1976

[30] Foreign Application Priority Data

Sept. 29, 1975 Germany .............................. 2543329

[51] Int. Cl.² ................................................ A21C 1/06
[52] U.S. Cl. ...................................... 366/84; 366/139; 425/145
[58] Field of Search .................... 259/192, 191, 193, 9, 259/10, 21, 23, 24, 25, 26, 97; 425/145, 146

[56] References Cited

U.S. PATENT DOCUMENTS

| | | | |
|---|---|---|---|
| 1,184,016 | 5/1916 | Price | 259/193 |
| 3,148,231 | 9/1964 | Spencer | 425/145 X |
| 3,274,647 | 9/1966 | Andouart | 259/192 |
| 3,728,056 | 4/1973 | Theysohn | 425/145 |

*Primary Examiner*—Edward J. McCarthy
*Attorney, Agent, or Firm*—Robert E. Burns; Emmanuel J. Lobato; Bruce L. Adams

[57] ABSTRACT

Apparatus for extruding plastic material, rubber and other thermoplasts and elastomers comprises two screw extruders each having a casing with a cylindrical bore and with a feed inlet and discharge, an extruder screw rotatable in the cylindrical bore of the casing and drive means at the opposite end of the casing from the discharge for rotating the extruder screw. The discharge of the first extruder is connected to the feed inlet of the second extruder so that material extruded by the first extruder is fed into the second extruder. A vacuum is applied to the interior of the casing of the second extruder in the vicinity of the inlet opening in order to degas material received in the second extruder from the first extruder. At a point slightly downstream from the inlet of the second extruder there is provided pressure responsive means for sensing pressure variations in the bore of the extruder. Control means responsive to the pressure sensing means regulates the relative speeds of rotation of the screws of the first and second extruders so that the screw channel of the screw of the second extruder in the vicinity of the inlet opening is not completely filled, thus leaving a space in the passage through which the vacuum is applied to the material to obtain an effective degassing thereof.

5 Claims, 3 Drawing Figures

METHOD AND APPARATUS FOR EXTRUDING PLASTIC AND SIMILAR MATERIAL

FIELD OF INVENTION

The present invention relates to a process and apparatus for extruding plastic material, rubber and other thermoplasts and elastomers and particularly to apparatus comprising two screw extruders of which the first feeds the second.

BACKGROUND OF INVENTION

Extruding apparatus is known in which two extruders are arranged in an L-shape configuration so that one extruder is fed by the other. Each of the extruders comprises a casing having a cylindrical bore and having inlet and discharge openings. A screw is rotatable in the cylindrical bore of the casing by drive means located at the end of the casing opposite the discharge. The discharge of one extruder is connected to the inlet of the other so that material extruded by the first extruder is fed into the second extruder.

In order to effect a degassing of the material, a vacuum is applied to the interior of the second extruder in the vicinity of the inlet opening so as to draw off gas inclusions from the material fed into the second extruder from the first extruder. However, it has been found that thorough and effective degassing of the material is not obtained so that gas inclusions still remain in the material as it is propelled by the extrusion screw toward the discharge of the second extruder.

SUMMARY OF INVENTION

It is an object of the present invention to provide a process and apparatus for achieving more thorough degassing of the plastic material fed by the first extruder into the second extruder. In accordance with the invention, it has been found that good degassing of the material to be extruded can be achieved when the screw channel of the extruder screw of the second extruder in the degassing zone is not completely filled but is filled only partially so as to leave a passage through which the vacuum is effectively applied to the material.

The invention is accordingly directed to the problem of so regulating the drive of the first extruder relative to the second extruder that the material fed into the second extruder by the first extruder does not completely fill the screw channel of the screw of the second extruder in the zone where vacuum is applied to degas the material in an adjustable definite way.

In order to solve this problem the pressure in the cylinder of the second extruder is measured at a point a short distance downstream from the inlet of the second extruder and the speed of rotation of the extruder screw in the first extruder is so regulated according to the pressure measurement so that the size, shape and spacing of pressure pulses measured by the sensing means are kept substantially constant. In this manner it is possible through control of the drive of the first extruder to regulate the desired extrusion rate and with the help of the control with the aid of the measured pressure values, the resident time and the surface of the material to be extruded in the vacuum zone can be so regulated that optimum resident time and optimum degassing can be attained.

In order to carry out the process automatically, means is provided for regulating the drive of the first screw extruder according to pressure measured in the second extruder at a point which is downstream of the inlet opening through which the second extruder is fed by the first extruder, i.e. in a direction toward the discharge, but within the zone of the vacuum which is applied in the vicinity of the inlet.

BRIEF DESCRIPTION OF DRAWING

The nature, objects and advantages of the invention will be more fully understood from the following description in conjunction with the accompanying drawings, in which.

Figure 1:
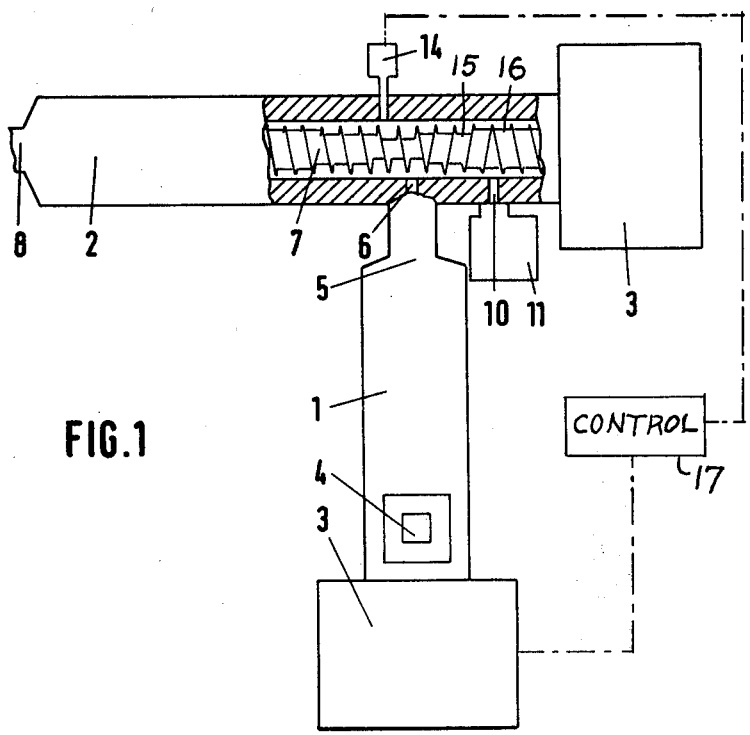
FIG. 1 is a schematic plan view of extrusion apparatus for carrying out the invention, the apparatus being shown partially in section.

DESCRIPTION OF PREFERRED EMBODIMENT:

As illustrated schematically in the drawing, the apparatus in accordance with the invention comprises two extruders 1 and 2 which are assembled in an L-shaped configuration so that material from extruder 1 is fed into extruder 2. Each of the extruders comprises a casing having a cylindrical bore and having inlet and discharge openings and an extruder screw which is rotatable in the cylindrical bore of the casing and is driven by drive means 3 located at the end of the casing opposite the discharge end. The material that is to be worked is fed into the feed hopper 4 of the first extruder 1, is worked in the first extruder and is extruded from the discharge end 5 of the first extruder. As the first extruder is fixedly attached to the second extruder, the material extruded from the first extruder is fed directly into the inlet 6 of the second extruder. Here the material is engaged by the screw 7 of the second extruder and is forwarded to the discharge head 8.

In the vicinity of the inlet 6 of the second extruder, the material received from the first extruder is degassed by means of vacuum equipment 11 connected with an opening 10 in the casing of the extruder so as to apply a vacuum to the equipment. As seen in FIG. 1, the opening 10 for connection to the vacuum equipment is located between the inlet 6 and the drive means 3 of the second extruder.

Figure 2:
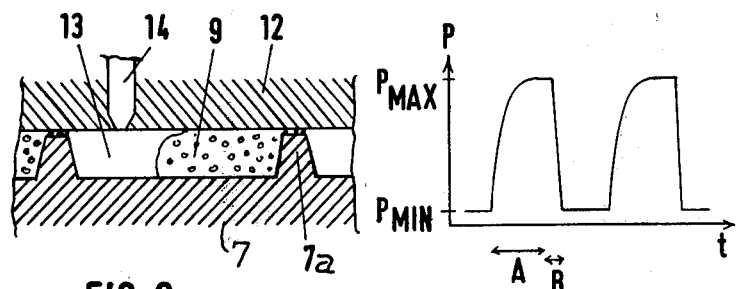
FIG. 2 is a greatly enlarged schematic representation of a section through a screw passage in the range of the vacuum zone.

As seen in FIG. 2, the material 9 that is to be degassed and extruded lies in the screw channel between the screw web 7a and the inner wall 12 of the cylinder of the second screw extruder 2 so that a hollow space 13 remains through which gas inclusions in the material can be drawn off by the vacuum equipment 11. As the material 9 is engaged by the screw 7 as well as by the inner wall of the cylinder 12, the material is continually in movement and hence gas bubbles contained in the material are brought to the surface where they are subjected to the vacuum applied through the hollow space 13. The bubbles thereupon burst and the gas inclusions are drawn off by the vacuum equipment.

In order to obtain optimal degassing of the material the extent to which the screw channel is filled by the material in the degassing zone is highly important. If there is too little material in the screw channel, the material is not properly propelled by the screw. If there is too much material, optimum degassing is not achieved. In order to assure the proper degree of filling of the screw channel with material, there is provided in accordance with the present invention regulating apparatus 17 for controlling the drive 3 of the first screw extruder 1 according to pressure pulses measured in the cylinder of the second extruder at a point a short distance downstream from the inlet 6. The pressure pulses are measured by a sensing device 14 which is connected with an opening in the cylinder wall a short distance downstream of the inlet opening 6, i.e. in a direction toward the discharge 8 but in the vacuum zone of the screw 7.

Figure 3:
FIG. 3 is a curve representing a series of measured pressure pulses.

In order to maintain the degree of filling of the screw channel of the second extruder constant, the drive of the first extruder is so controlled that pressure pulses sensed by the pressure measuring device 14 have a constant size, shape and spacing as illustrated by way of example in FIG. 3. In FIG. 3, the pressure measured by the sensing device 14 is plotted against time. In the zone of the hollow space 13 a minimum pressure value $P_{min}$ is measured while in the zone of the material 9 being propelled by the screw 7, the maximum pressure value $P_{max}$ is measured. The length of the pulses comprises two parts A and B. The part A stems from the material while the part B stems from the back of the web by reason of leakage of material between the web and the inner wall of the cylinder. The spacing between two pulses corresponds to that time during which the hollow space 13 moves passed the pressure sensing device 14.

Corresponding to different materials to be extruded the relative speeds of the first and second extruders is controlled so as to provide the proper pulse form, size and spacing to obtain optimum degassing of the material.

As disclosed more fully in my copending application, Ser. No. 727,990, filed simultaneously herewith, a portion 15 of the screw of the second extruder 2 between the inlet opening 6 and the vacuum opening 10 has a reverse pitch so that any material separated from the mass of material by the bursting of the bubbles of the gas inclusions is propelled toward and discharged through the opening 10. A further portion 16 of the screw between the opening 10 and the drive means 3 has a forwardly directed pitch so as to propel any material it engages toward the opening 10. In this manner, material which is separated from the main mass of material and which may have its characteristics altered by reason of an increased dwell time in the extruder is prevented from rejoining the main mass of material but rather is lead to a separate outlet.

It will be recognized by those skilled in the art that many variations and modifications may be made and hence the invention is in no way limited to the particular embodiment of apparatus shown by way of example in the drawing.

What I claim is:

1. Apparatus for extruding plastic material, rubber and other thermoplasts and elastomers, comprising first and second screw extruders each having a casing with a cylindrical bore and with a feed inlet and a discharge, an extruder screw rotatable in said cylindrical bore of said casing and having a screw channel, and drive means at the opposite end of said casing from said discharge for rotating said extruder screw, the discharge of said first extruder being connected to the feed inlet of said second extruder whereby material extruded by said first extruder is fed into said second extruder, means for applying a vacuum to the interior of the casing of said second extruder in a degassing zone in the vicinity of said inlet thereof to degas material received in said second extruder from said first extruder, means for sensing pressure pulses in the bore of said second extruder at a point slightly downstream from said inlet thereof but in the zone of application of said vacuum to determine the extent to which the channel of the extruder screw of said second extruder is filled with said material in said degassing zone, and means responsive to said sensing means for controlling the relative speeds of rotation of the screws of said first and second extruders so that the screw channel of the screw of said second extruder is the vicinity of the inlet thereof is not completely filled with said material, thereby leaving space in said channel through which said vacuum is applied to the material to effect a degassing thereof.

2. Apparatus according to claim 1, in which the casing of said second extruder is provided with an opening located between said inlet and said drive means of said second extruder, said vacuum applying means being connected to said opening.

3. Apparatus according to claim 2, in which a portion of the extruder screw of said second extruder between said inlet and said opening to which said vacuum applying means is connected has a reverse pitch so as to propel material toward said opening.

4. Apparatus according to claim 1, in which said controlling means comprises means for controlling said relative speeds of rotation of the screws of said first and second extruders so that the size, shape and spacing of said pressure pulses sensed by said sensing means are kept substantially constant.

5. A process for extruding plastic material, rubber and other thermoplasts and elastomers by means of first and second screw extruders, each having a casing with a cylindrical bore and with a feed inlet and a discharge, an extruder screw rotatable in the casing and having a screw channel, and drive means at the opposite end of the casing from said discharge for driving the screw, the discharge of the first extruder being connected to the inlet of the second extruder, said process comprising the steps of feeding material to be extruded to the inlet of the first extruder, operating said first extruder to extrude material into the inlet of said second extruder, operating said second extruder to propel said material toward the discharge of said second extruder, applying a vacuum to the interior of the casing of said second extruder in a degassing zone in the vicinity of the inlet thereof to degas the material fed into the second extruder by the first extruder, continually measuring pressure pulses in the bore of said second extruder at a point a short distance from the inlet thereof in a direction toward the discharge but in the zone of application of said vacuum to determine the extent to which the channel of the extruder screw of said second extruder is filled with said material in said degassing zone, and controlling the speed of rotation of the screw of the first extruder in relation to the speed of the second extruder according to the measured pressure pulses to maintain a continuity of measured pressure pulses of like size, form and spacing, whereby the material is fed by said first extruder into the second extruder at a rate only partially to fill the screw channel of the second extruder and thereby provide a hollow space through which vacuum is applied to said material as it is propelled by said screw of said second extruder.

* * * * *